(12) United States Patent
Jeong et al.

(10) Patent No.: US 11,818,800 B2
(45) Date of Patent: *Nov. 14, 2023

(54) METHOD AND APPARATUS FOR IMPROVING SERVICE RELIABILITY IN WIRELESS COMMUNICATION SYSTEM

(71) Applicant: Samsung Electronics Co., Ltd., Suwon-si (KR)

(72) Inventors: Sangsoo Jeong, Suwon-si (KR); Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,392

(22) Filed: Jul. 8, 2022

(65) Prior Publication Data

US 2022/0346189 A1 Oct. 27, 2022

Related U.S. Application Data

(63) Continuation of application No. 16/946,163, filed on Jun. 8, 2020, now Pat. No. 11,412,572.

(30) Foreign Application Priority Data

Jun. 10, 2019 (KR) .................. 10-2019-0068265

(51) Int. Cl.
*H04W 80/10* (2009.01)
*H04W 76/11* (2018.01)
(Continued)

(52) U.S. Cl.
CPC ............ *H04W 80/10* (2013.01); *H04W 8/08* (2013.01); *H04W 24/08* (2013.01); *H04W 48/16* (2013.01); *H04W 76/11* (2018.02)

(58) Field of Classification Search
CPC ....... H04W 80/10; H04W 8/08; H04W 24/08; H04W 48/16; H04W 76/11; H04W 88/14;
(Continued)

(56) References Cited

U.S. PATENT DOCUMENTS

2019/0059067 A1 2/2019 Lee et al.
2019/0159015 A1 5/2019 Qiao et al.
(Continued)

FOREIGN PATENT DOCUMENTS

WO 2019/103462 A1 5/2019

OTHER PUBLICATIONS

Eicsson ,SMFcontext transfer, S2-1906774, 3GPP TSG-SA2 Meeting #133, Reno, USA, May 2019 (Year: 2019).*
(Continued)

*Primary Examiner* — Said M Elnoubi

(57) ABSTRACT

A method, performed by a first Session Management Function (SMF), for providing a continuous service to a user equipment (UE) includes: identifying, by the first SMF, triggering of an SMF change operation; transmitting, to an Access and Mobility Management Function (AMF), a message indicating a change in a status of a Packet Data Unit (PDU) session of the UE so as to request a procedure of changing an SMF; receiving a context request message requesting a context of the UE from a second SMF that is a target SMF; and transmitting a context request response message to the second SMF.

20 Claims, 11 Drawing Sheets

(51) Int. Cl.
   *H04W 8/08*      (2009.01)
   *H04W 24/08*     (2009.01)
   *H04W 48/16*     (2009.01)
(58) Field of Classification Search
   CPC . H04W 76/22; H04W 24/04; H04W 36/0033; H04W 36/26; H04W 36/385; H04W 88/18; H04L 67/02; H04L 67/14
   See application file for complete search history.

(56) References Cited

U.S. PATENT DOCUMENTS

| | | | |
|---|---|---|---|
| 2019/0261449 A1* | 8/2019 | Kim | H04L 65/1046 |
| 2020/0228605 A1 | 7/2020 | Dodd-Noble et al. | |

OTHER PUBLICATIONS

Office Action dated Nov. 3, 2022 in connection with Chinese Patent Application No. 202010521451.5, 13 pages.
International Search Report and Written Opinion of the International Searching Authority in connection with International Application No. PCT/KR2020/007454 dated Sep. 9, 2020, 10 pages.
European Search Report dated Oct. 2, 2020 in connection with European Application No. 20179188.6, 11 pages.
European Patent Office, "Communication pursuant to Article 94(3) EPC" dated Mar. 3, 2022, in connection with European Patent Application No. 20179188.6, 5 pages.
3GPP TS 23.502 V16.0.2 (Apr. 2019), Technical Specification, 3rd Generation Partnership Project; Technical Specification Group Services and System Aspects; Procedures for the 5G System; Stage 2 (Release 16), Apr. 2019, 419 pages.
Ericsson, "SMF context transfer," S2-1906744 (revision of S2-196729), 3GPP TSG-SA2 Meeting #133, Reno, USA, May 13-17, 2019, 4 pages.
Ericsson, "SMF context transfer," S2-1905060 (revision of S2-19xxxx), 3GPP TSG-SA WG2 Meeting #133, Reno, NV, May 13-17, 3 pages.
Huawei et al., "Service operation clarification and resource release," S2-1906397, 3GPP TSG-SA2 Meeting #133, Reno, USA, May 13-17, 2019, 18 pages.
Samsung: "Correction on SM context transfer procedure," S2-1910156 revision of 9176, 3GPP TSG-SA WG2 Meeting #135, Split Croatia, Oct. 14-18, 2019, 4 pages.
Intellectual Property India, "Hearing Notice" dated Apr. 21, 2023, in connection with Indian Patent Application No. 202014024208, 3 pages.
Communication under Rule 71(3) EPC, dated Aug. 28, 2023, in connection with European Patent Application No. 20179188.6, 67 pages.

* cited by examiner

METHOD AND APPARATUS FOR IMPROVING SERVICE RELIABILITY IN WIRELESS COMMUNICATION SYSTEM

CROSS-REFERENCE TO RELATED APPLICATION

This application is a continuation of application Ser. No. 16/946,163, filed Jun. 8, 2020, which is based on and claims priority under 35 U.S.C. § 119 to Korean Patent Application No. 10-2019-0068265, filed on Jun. 10, 2019, in the Korean Intellectual Property Office, the disclosures of which are incorporated by reference herein in their entirety.

BACKGROUND

1. Field

The disclosure relates to a method of managing a context in a mobile communication system.

2. Description of the Related Art

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called Beyond 4G network communication systems or Post Long Term Evolution (LTE) systems.

In order to achieve a high data transfer rate, consideration is given to implementing 5G communication systems in millimeter wave (mmW) frequency bands (e.g., 60 GHz bands). In order to reduce propagation path loss of radio waves and increase a propagation distance of radio waves in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna.

Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway.

Furthermore, in 5G communication systems, developments of an advanced coding modulation (ACM) scheme such as hybrid frequency shift keying and quadrature amplitude modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

5G communication systems consider resources for various services, compared with existing 4G communication systems. For example, most representative services may include an enhanced mobile broad band (eMBB) communication service, an ultra-reliable and low latency communication (URLLC) service, a massive machine type communication (mMTC) service, and an evolved multimedia broadcast/multicast service (eMBMS). In addition, a system providing the URLLC service may be referred to as a URLLC system, and a system providing an eMBB service may be referred to as an eMBB system. Also, the terms 'service' and 'system' may be used interchangeably.

Among them, the URLLC service is a service that is newly considered in the 5G system unlike the existing 4G system, and requires satisfaction of the conditions of an ultra high reliability (for example, a packet error rate of about $10^{-5}$) and a low latency (for example, about 0.5 msec), compared to other services. In order to satisfy these strict conditions, the URLLC service may need to apply a transmission time interval (TTI) shorter than the eMBB service, and various operation methods utilizing the same are considered.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied.

In IoT environments, an intelligent Internet Technology (IT) service for collecting and analyzing data generated by connected things and creating a new value in people's lives may be provided. IoT is applicable to various fields, such as smart home, smart building, smart city, smart car or connected car, smart grid, health care, smart home appliances, and advanced medical care, via fusion and combination of existing information technology (IT) with various industries.

Accordingly, various attempts are being made to apply 5G communication systems to IoT networks. For example, technology such as a sensor network, machine-to-machine (M2M) communication, or MTC is implemented by 5G communication technology such as beam-forming, MIMO, or array antenna. The application of a cloud RAN as big data processing technology may also be considered as an example of convergence of 5G technology and IoT technology.

Meanwhile, due to the development of various IT technologies, pieces of network equipment have evolved into virtualized network functions (NFs) by applying virtualization technology, and the virtualized NFs may be implemented in an SW form by deviating from a physical restriction and thus may be installed/operated in several types of Cloud or data center (DC). In particular, the NFs may be freely expanded/reduced (scaling) or initiated/terminated according to service requirements, a system capacity, and a network load.

SUMMARY

Provided is a structure for and a communication method of exchanging or storing user data (Context) processed by network functions (NFs) in order to increase communication efficiency and improve a customer service quality in a $5^{th}$ generation (5G) system.

Additional aspects will be set forth in part in the description which follows and, in part, will be apparent from the description, or may be learned by practice of the presented embodiments of the disclosure.

According to an embodiment of the disclosure, a method, performed by a first Session Management Function (SMF), for providing a continuous service to a user equipment (UE) includes: identifying, by the first SMF, triggering of an SMF change operation; transmitting, to an Access and Mobility Management Function (AMF), a message indicating a change in a status of a Packet Data Unit (PDU) session of the UE so as to request a procedure of changing an SMF; receiving a context request message requesting a context of the UE from a second SMF that is a target SMF; and transmitting a context request response message to the second SMF.

The SMF change operation may be triggered in response to a request by Operations, Administration and Maintenance (OAM), and the request by the OAM may include identification information of the second SMF.

The method may further include: transmitting, to the AMF, a message requesting notification of information about a change in a status of the UE; and receiving, from the AMF, a notification message indicating the change in the status of the UE.

The message indicating the change in the status of the PDU session with respect to the UE may include at least one of identification information of the second SMF, context identification (ID), or ID information of the UE.

The context request response message may include the context of the UE which is requested by the second AMF, and the context may include information about a User Plane Function (UPF) to be selected by the second SMF.

According to an embodiment of the disclosure, a method, performed by an Access and Mobility Management Function (AMF), for providing a continuous service to a user equipment (UE) includes: receiving, from a first Session Management Function (SMF), a message indicating a change in a status of a Packet Data Unit (PDU) session of the UE so as to request a procedure of changing an SMF; selecting a second SMF that is a target SMF; transmitting, to the second SMF, a request message of requesting generation of a new session; and receiving, from the second SMF, a response message with respect to the request message of requesting generation of the new session.

The selecting of the second SMF may be performed by the AMF or is performed through a Service Communication Proxy (SCP).

The method may further include: receiving, from the first SMF, a message requesting notification of information about a change in a status of the UE; monitoring the change in the status of the UE; and transmitting, to the first SMF, a notification message indicating the change in the status of the UE, based on a result of the monitoring.

The message indicating the change in the status of the PDU session with respect to the UE may include at least one of identification information of the second SMF, context identification (ID), or ID information of the UE, and the identification information of the second SMF may include SMF set identification information.

The second SMF may be registered in a Unified Data Management (UDM).

According to an embodiment of the disclosure, a first Session Management Function (SMF) for providing a continuous service to a user equipment (UE) includes: a transceiver; and a processor combined with the transceiver and configured to identify, by the first SMF, triggering of an SMF change operation, transmit, to an Access and Mobility Management Function (AMF), a message indicating a change in a status of a Packet Data Unit (PDU) session of the UE so as to request a procedure of changing an SMF, receive a context request message requesting a context of the UE from a second SMF that is a target SMF, and transmit a context request response message to the second SMF.

The SMF change operation may be triggered in response to a request by Operations, Administration and Maintenance (OAM), and the request by the OAM may include identification information of the second SMF.

The processor may be further configured to transmit, to the AMF, a message requesting notification of information about a change in a status of the UE, and receive, from the AMF, a notification message indicating the change in the status of the UE.

The message indicating the change in the status of the PDU session with respect to the UE may include at least one of identification information of the second SMF, context identification (ID), or ID information of the UE.

The context request response message may include the context of the UE which is requested by the second SMF, and the context may include information about a User Plane Function (UPF) to be selected by the second SMF.

According to an embodiment of the disclosure, an Access and Mobility Management Function (AMF) for providing a continuous service to a user equipment (UE) includes: a transceiver; and a processor combined with the transceiver and configured to receive, from a first Session Management Function (SMF), a message indicating a change in a status of a Packet Data Unit (PDU) session of the UE so as to request a procedure of changing an SMF, select a second SMF that is a target SMF, transmit, to the second SMF, a request message of requesting generation of a new session, and receive, from the second SMF, a response message with respect to the request message of requesting generation of the new session.

The selecting of the second SMF may be performed by the AMF or may be performed through a Service Communication Proxy (SCP).

The processor may be further configured to receive, from the first SMF, a message requesting notification of information about a change in a status of the UE, monitor the change in the status of the UE, and transmit, to the first SMF, a notification message indicating the change in the status of the UE, based on a result of the monitoring.

The message indicating the change in the status of the PDU session with respect to the UE may include at least one of identification information of the second SMF, context identification (ID), or ID information of the UE, and the identification information of the second SMF may include SMF set identification information.

The second SMF may be registered in a Unified Data Management (UDM).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
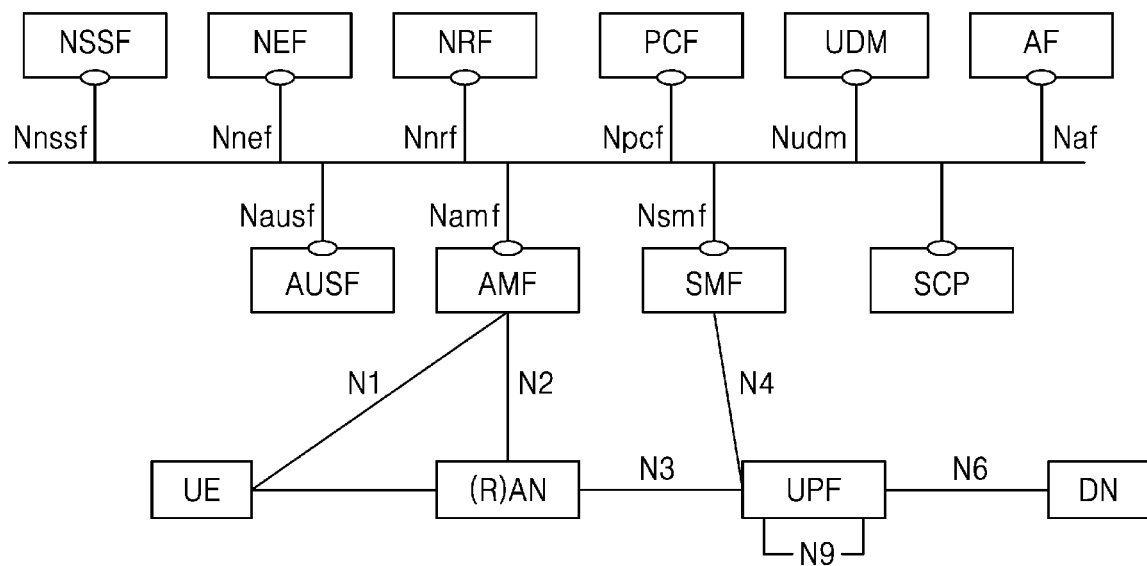
FIG. 1 illustrates a 5$^{th}$ generation (5G) system structure based on a service-based architecture (SBA) according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Operation principles of the disclosure will now be described more fully with reference to the accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term 'unit' or '~er(or)' used herein denotes a software element or a hardware element such as a field-programmable gate array (FPGA) or an application-specific integrated circuit (ASIC), and performs a certain function. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers (ors)' may be implemented to operate one or more central processing units (CPUs) in a device or a secure multimedia card. According to an embodiment of the disclosure, the 'unit' or '~er(or)' may include one or more processors.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In particular, the disclosure may be applied to the $3^{rd}$ Generation Partnership Project (3GPP) New Radio (NR) ($5^{th}$ generation (5G) mobile communications standard). The disclosure are applicable to intelligent services based on the 5G communication technology and the Internet of Things (IoT) related technology (e.g., smart home, smart building, smart city, smart car or connected car, health care, digital education, retail business, and security- and safety-related service). In the disclosure, eNB may be used interchangeably with gNB for convenience of explanation. In other words, a base station described as an eNB may also indicate a gNB. Furthermore, the term 'terminal' may refer to a mobile phone, NB-IoT devices, sensors, and other wireless communication devices.

As used in the following description, terms identifying access nodes, terms indicating network entities or network functions (NFs), terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used. An NF may be a network entity.

Hereinafter, for convenience of description, the disclosure uses terms and names defined in the 3GPP Long Term Evolution (LTE) standard and the 5G standard. However, the disclosure is not limited to the terms and names but may also be identically applied to systems that comply with other standards.

In describing the embodiments of the disclosure, information (UE Context) of a UE processed/managed by the NF is mainly described, and the information (UE Context) of the UE may include, but is not limited to, a mobility management (MM) context related to UE mobility, an access management (AM) context related to a wireless connection, and a session management (SM) context related to a session, and may include all necessary types stored/processed/generated for a service in a communication network.

In the disclosure, the term 'service' is used to refer to a specific communication equipment (or NF) performing a request of another communication equipment (or NF), that is, an NF service, and, when a service delivered to an actual user (End-User) is specifically limitedly referred to, the term 'service' is distinguishably used as a customer service.

According to an embodiment of the disclosure, in order to increase communication efficiency and improve a customer service quality in a system, a structure for and a communication method of exchanging or storing user data (Context) processed by NFs are provided. In addition, according to an embodiment of the disclosure, a method of preventing a service processing conflict (transaction collision or race condition) between NFs that may occur when introducing a structure for exchanging and storing user data processed by NFs is proposed. Furthermore, according to an embodiment of the disclosure, a method of increasing the speed of exchanging and processing data between NFs to improve a service quality and increase network operation efficiency is proposed.

Additional aspects will be set forth in part in the description which follows and, in part, will be apparent from the description, or may be learned by practice of the presented embodiments.

Although embodiments of the disclosure are hereinafter described with respect to an LTE, LTE-Advanced (LTE-A), LTE Pro, or 5G (or NR as next-generation mobile communication) system, the embodiments of the disclosure may be applied to other communication systems having similar technical backgrounds and channel configurations. Furthermore, it should be understood by those skilled in the art that the embodiments of the disclosure are applicable to other communication systems though modifications not departing from the scope of the disclosure.

The disclosure will now be described more fully with reference to the accompanying drawings, in which exemplary embodiments are shown.

FIG. 1 illustrates a 5G system structure based on a service-based architecture (SBA) according to an embodiment of the disclosure.

A new system structure and a protocol are needed to support various services of 5G, and the 3GPP decided to introduce a new technology called an SBA. The main characteristics of the SBA are to divide the functionalities of NFs defined in the 3GPP standard in units of services in consideration of virtualization technology, introduction of the cloud environment, and expansion of web-based services, and to use an HTTP/2 protocol in implementing these services. The main characteristics of the SBA are not limited to these examples.

Referring to FIG. 1, an access and mobility management function (AMF) is an NF that manages wireless network access and mobility with respect to a user equipment (UE). A session management function (SMF) is an NF that manages a session for a UE, and session information includes quality of service (QoS) information, charging information, and information about packet processing. A user plane function (UPF) is an NF that processes user plane traffic, and is controlled by the SMF. Although not shown in FIG. 1, the 5G system may include an unstructured data storage network function (UDSF), and the UDSF is an NF that stores unstructured data, and any type of data may be stored or retrieved at a request of the NF.

Referring to FIG. 1, a radio access network (RAN) may refer to a radio access network, and may refer to a radio network between a UE and a base station or the base station itself. A data network (DN) may refer to a data network, and the DN may transmit a packet data unit (PDU), which is to be transmitted to the UE, to the UPF, and may receive a PDU transmitted by the UE through the UPF.

A policy control function (PCF) may be an NF that determines a policy related to charging, an application function (AF) may be an NF that provides information on a packet flow to guarantee a QoS, an authentication server function (AUSF) may be an NF that stores information for UE authentication, and a unified data management (UDM) may be an NF that stores information about a user.

Referring to FIG. 1, a network slice selection function (NSSF) may be an NF that selects a network slice corresponding to a UE, and a network exposure function (NEF) may be an NF that provides, for example, a 3rd party, internal exposure/re-exposure, an application function, and a means to securely expose services and capabilities for edge computing that are provided by 3GPP network functions.

A network repository function (NRF) may support service discovery, may be an NF that maintains available NF instances and services supported by NF instances, and a Service Communication Proxy (SCP) may be an NF that controls a service of a network.

According to an embodiment of the disclosure, the NFs may communicate with each other by using predetermined interfaces. For example, the AMF and the UE may perform communication using an interface N1, and the UPF and the SMF may perform communication using an interface N4. The other NFs may also communicate with each other using predetermined interfaces as shown in FIG. 1. This is obvious to one of ordinary skill in the art, and thus detailed descriptions thereof will be omitted.

The 5G system of FIG. 1 may be configured by excluding at least one of the illustrated NFs, and is not limited to the above example.

Figure 2:
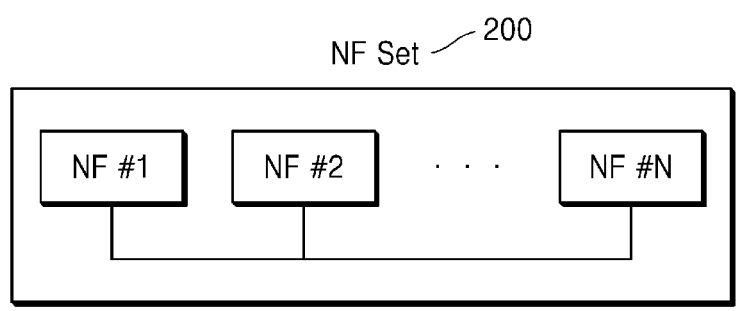
FIG. 2 illustrates a network function (NF) configuration and a context management structure, according to an embodiment of the disclosure.

FIG. 2 illustrates an NF configuration and a context management structure, according to an embodiment of the disclosure.

Referring to FIG. 2, information of a UE (UE context), which is data inside the NF, may be exchanged/shared with each other between NFs, and a set of NFs that share and use the data inside the NF is referred to as an NF set 200. According to an implementation environment, a specific NF may be operated/managed in the form of an NF Instance, and embodiments of the disclosure are applicable to a managing and operating environment of any type of NF or NF instance.

According to an embodiment of the disclosure, during an operation of an NF service unit instead of implementation/establishment of an NF unit, an NF may be replaced with an NF service. Accordingly, the term 'NF' in the disclosure may include an NF instance, an NF service, and an NF service instance.

According to an embodiment of the disclosure, if multiple NF sets coexist, identifiers (IDs) or names that are identifiable with each other may be assigned to distinguish the multiple NF sets from one another. Even when the NFs within an NF set operate by sharing different contexts, the NFs may be given different IDs/names in terms of management/operation.

Figure 3:
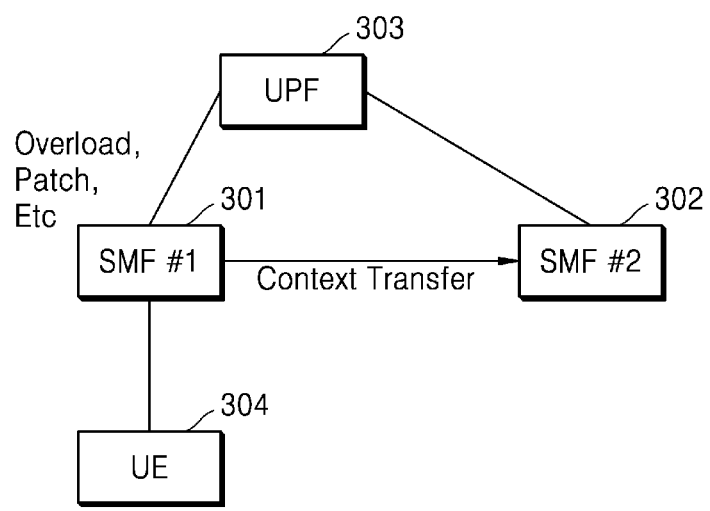
FIG. 3 illustrates an example of an operation of a 5G system including a user equipment (UE), a base station, and a core, according to an embodiment of the disclosure.

FIG. 3 illustrates an example of an operation of a 5G system including a UE, a base station, and a core, according to an embodiment of the disclosure.

Referring to FIG. 3, an SMF #1 301 and an SMF #2 302 may be SMF instances included in the same SMF set. Two SMFs (e.g., the SMF #1 301 and the SMF #2 302) may be connected to a UPF 303 and provide a service.

When the SMF #1 301 is no longer able to provide a service while providing a service for a UE 304, the SMF #1 301 may provide a UE context (in more detail, a session management (SM) context) included therein to the SMF #2 302 and then provide a service to the UE 304 by interoperating with the UPF 303. At this time, the SMF #1 301 and the SMF #2 302 have to transmit the UE context in a manner that a collision therebetween, a race condition, or a change in the UE context does not occur in the transmission of the UE context.

In the disclosure, the following embodiments of the disclosure in which a UE continues providing service in an idle status or an inactive status to prevent occurrence of errors such as a collision during transmission, a race condition, and a UE context change were considered to be applied. Of course, the disclosure is not limited to the above example, and embodiments of the disclosure may be applied only in one status selected among the two statuses according to network settings and operator preferences.

Figure 4:
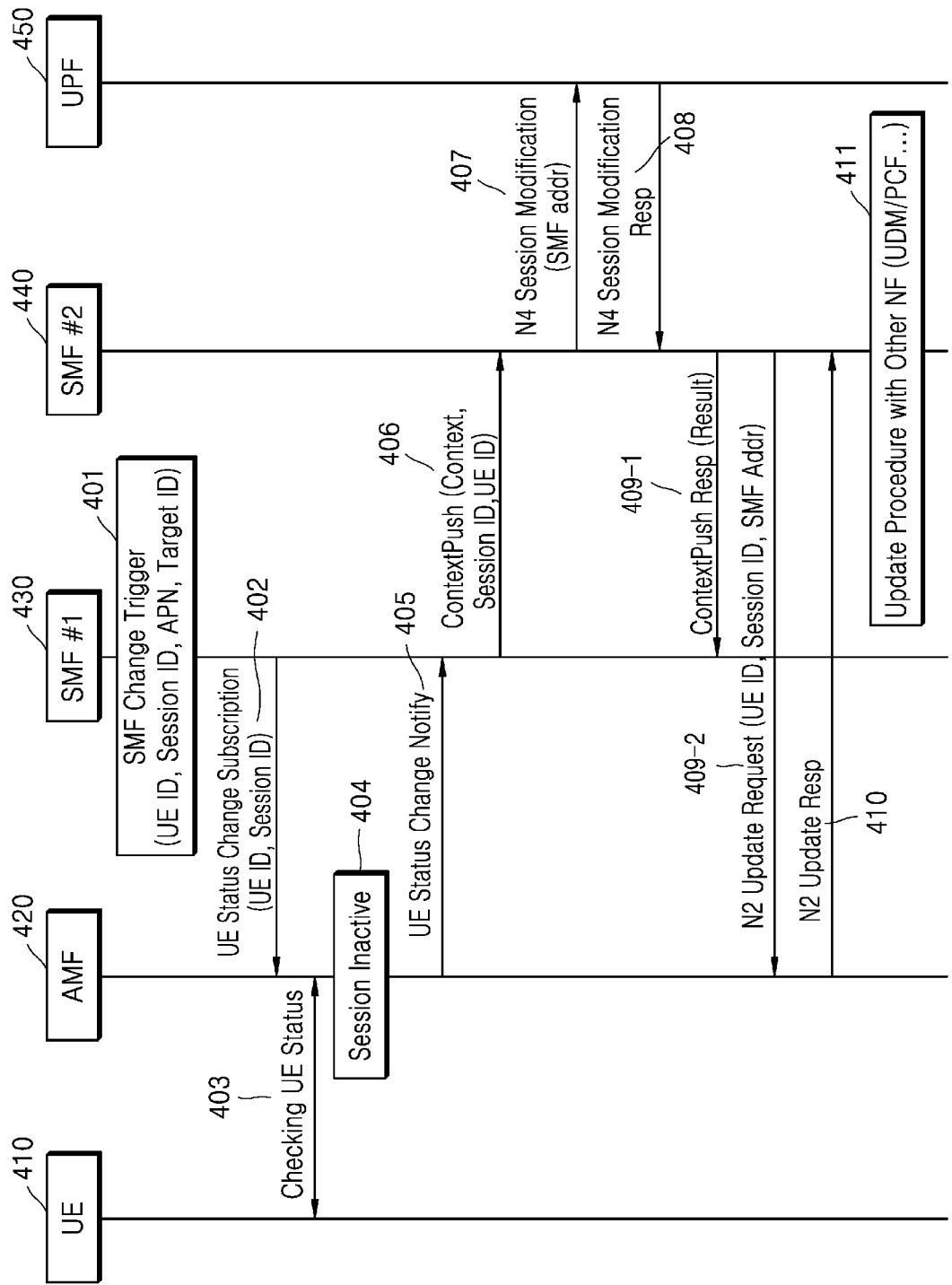
FIG. 4 illustrates a flowchart of a method of processing a service without collisions while maintaining the service when a change in an NF is necessary during a service, according to an embodiment of the disclosure.

FIG. 4 is a flowchart of a method of processing a service without collisions while maintaining the service when an SMF needs to be changed during service provision, according to an embodiment of the disclosure.

In operation 401, an SMF #1 430 represents an old SMF that has provided a service for a UE 410. In operation 401, a condition for forwarding processing of the service to another SMF may be satisfied in the SMF #1 430. An operation of changing an SMF may begin according to an instruction of an operator or may begin at a request of an operation and management (OAM) system. In this case, the instruction or request for changing the SMF may include designation of a specific UE (or subscriber), a specific session, and a specific data network name (DNN)/access point name (APN)/Slice, or may include designation of a target (target SMF; in the present embodiment, a SMF #2 440) that subsequently receives a service from the SMF.

The SMF #1 430 may wait for a state where traffic transmission or transaction for a UE does not occur such that the above-described error such as a collision or a race condition is not generated when a service for a specific UE (or subscriber) is transferred to another SMF. When the SMF #1 430 knows that a protocol data unit (PDU) session for the UE 410 is in an idle status or an inactive status, the method may directly proceed to operation 406.

In operation 402, the SMF #1 430 may transmit to an AMF 420 a subscription message for receiving an alarm when the status of the UE 410 is changed to the idle or inactive status, in order to know that the PDU session of the UE 410 has entered the idle or inactive status. The subscription message may include, but is not limited to, an ID of a target UE (subscriber) and an ID of a target PDU session.

In operation 403, the AMF 420 may monitor a change in the status of the UE 410.

When the status of the PDU session of the UE 410 requested from the SMF #1 430 in operation 402 is satisfied (e.g., the idle or inactive status) in operation 404, the AMF 420 may perform operation 405.

In operation 405, the AMF 420 may notify the SMF #1 430 that the status of the PDU session of the UE 410 has been changed.

In operation 406, the SMF #1 430 may know that the status of the UE 410 is appropriate to perform an operation for transferring an SMF, and may perform an operation for transmitting a context for a specific PDU session to a target SMF.

According to an embodiment of the disclosure, the SMF #1 430 may request the SMF #2 440 for a Nsmf_PDUSession_ContextPush service. The request for the Nsmf_PDUSession_ContextPush service may include a UE context for the PDU session. The request for the Nsmf_PDUSession_ContextPush service may also include an explicit requester (SMF Reallocation/Change Indication) indicating that not only a context needs to be transmitted but also then an SMF for a corresponding PDU session needs to be changed and that a service for the PDU Session needs to be subsequently provided to the UE 410.

In operation 407, the SMF #2 440 determines whether a request is able to be processed according to a received context, and, when it is determined that an SMF is able to be changed, the SMF #2 440 may perform a process of searching for a UPF (packet data network (PDN) gateway (PGW) user plane function (PGW-U)) 450 by using PGW-U Tunnel Information included in the received context and changing an N4 path to the changed SMF. At this time, the SMF #2 440 may update SMF information by using an N4 session modification procedure. Although not shown in FIG. 5, the SMF #2 440 may instead perform a process of releasing and then establishing an N4 session.

In operation 408, the SMF #2 440 may receive a response from the UPF 450.

In operation 409-1, the SMF #2 440 may notify the SMF #1 430 of a result of the request. When the request fails and the SMF #2 440 notifies the SMF #1 430 of the result of the request, the SMF #2 440 may add a failure cause to a notification and transmit the notification. Each failure cause may be replaced by a pre-arranged number.

Cause #1: Not sufficient resources, that is, when resources are not sufficient in SMF #2

Cause #2: Failure in N4 session, that is, when the SMF #2 440 fails in session change/generation with an UPF Cause #3: Authorized, that is, when a request of SMF #1 is not acceptable Cause #4: Semantic error, that is, when an error is generated while the received context is being processed When the processing fails, the entire procedure is terminated.

When the request succeeds, in operation 409-2, the SMF #2 440 may perform an operation for changing an SMF to transmit or receive a session management (SM) message and process the SM message with the AMF 420. To search for the AMF 420, the SMF #2 440 may use AMF information (AMF ID) included in the received UE context and may request an update for N2, and the update request may include a UE (subscriber) as a target, a PDU Session ID, and an ID/address of the SMF.

In operation 410, the AMF 420 transmits a response for a process for updating SMF information to the SMF #2 440.

In operation 411, the SMF #2 440 may perform remaining procedures which are to be processed due to a change in the SMF. The remaining procedures may include, for example, a process of performing registration in an UDM and a process of setting a PCC session with a PCF. Embodiments of the disclosure are not limited thereto.

Figure 5:
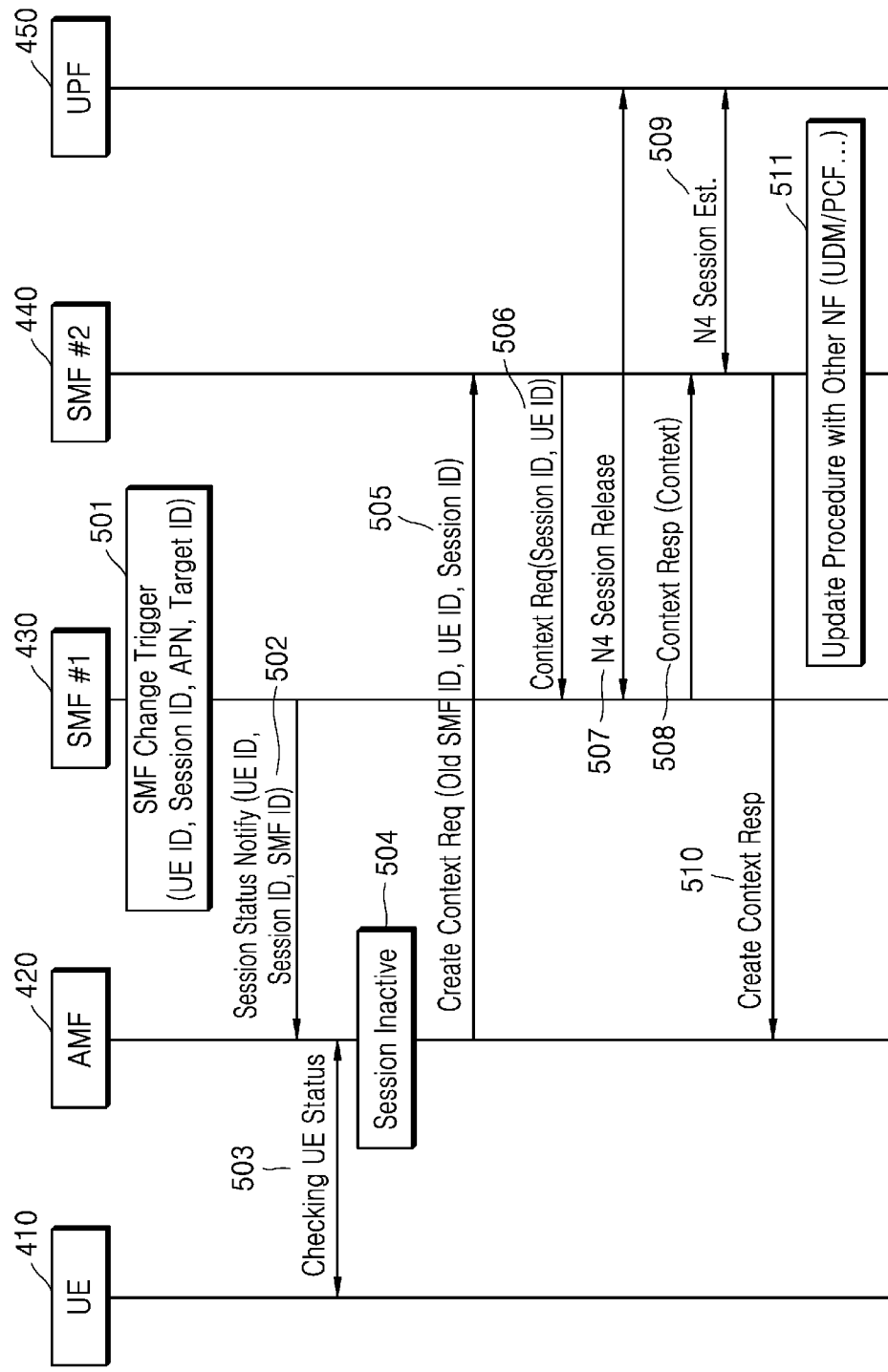
FIG. 5 illustrates a flowchart of a method of processing a service without collisions while maintaining the service when a change in an NF is necessary during a service, according to an embodiment of the disclosure.

FIG. 5 is a flowchart of a method of processing s service without collisions while maintaining the service when a change in an SMF is necessary during a service, according to an embodiment of the disclosure.

In operation 501, the SMF #1 430 represents an old SMF that has provided a service for the UE 410. In operation 501, a condition for forwarding a service for the UE 410 to another SMF may be satisfied in the SMF #1 430. An operation of changing an SMF may begin according to an instruction of an operator or may begin at a request of an OAM system. In this case, the instruction or request for changing the SMF may include designation of a specific UE (or subscriber), a specific session, and a specific DNN/APN/Slice, or may include designation of a target (target SMF; in the present embodiment, the SMF #2 440) that subsequently receives a service from the SMF.

The SMF #1 430 may wait for a state where traffic transmission or transaction for a UE does not occur such that the above-described error such as a collision or a race condition is not generated when a service for a specific UE (or subscriber) is transferred to another SMF.

In operation 502, when the PDU session of the UE 410 is in an idle or inactive status, the SMF #1 430 may transmit a notification of notifying a change in the status of the PDU session for a UE, in order to request the AMF 420 for an operation for changing an SMF. Before performing operation 502, a subscription procedure for receiving a notification when a status for a specific PDU session has been changed from the AMF 420 to the SMF #1 430 may be conducted.

When the change in the status of the PDU session is notified and the SMF #1 430 is able to identify a target context as a separate ID, the SMF #1 430 may include a context ID, a context type, and the ID of an SMF that is to be changed in a notification of notifying a change in the status of the PDU session and may transmit the notification. If the context ID is unable to be specified, the SMF #1 430 may include the ID of a target UE (subscriber), the ID of the PDU session, a Context Type, and the ID of the SMF that is to be changed, in the notification, and may transmit the notification.

In operation 503, the AMF 420 may monitor a change in the status of the UE 410.

When the status of the PDU session of the UE 410 requested from the SMF #1 430 in operation 502 is satisfied (e.g., the idle or inactive status) in operation 504, the AMF 420 may perform operation 505.

In operation 505, the AMF 420 may perform an operation for changing the SMF, because the statue of the PDU session of the UE 410 has been suitably changed to perform an operation for transferring the SMF to the SMF #1 430. The AMF 420 may transmit, to the SMF #2 440, a request for receiving a context for the PDU session and providing a service, by using the ID of the SMF #2 440 received in operation 502. A message of the request from the AMF 420 to the SMF #2 440 may include the ID of an SMF (SMF #1 430) that has provided a service to the UE 410, the ID and type of a target context or the ID of a target UE, the ID of the PDU session, and the type of context.

In operation 506, the SMF #2 440 may transmit a context request for receiving a context from the SMF #1 430 and providing a service.

According to an embodiment of the disclosure, the SMF #2 440 may request context transmission by using a Nsmf_PDUSession_ContextRequest service by operating as a consumer. For example, when the SMF #2 440 has received a Context ID, the SMF #2 440 may request the SMF #1 430 to transmit a context by using the Context ID and the Context Type. Otherwise, the SMF #2 440 may request the SMF #1 430 to transmit a context by using the ID of a target UE (subscriber), the ID of the PDU session, and the Context Type.

When the SMF #2 440 is unable to subsequently received and provide a service, the SMF #2 440 may refuse the request. When the SMF #2 440 refuses the request, the SMF #2 440 may include a failure cause in a refusal message and transmit the refusal message. Each failure cause may be replaced with a pre-arranged number.

Cause #1: Not sufficient resources, that is, when resources are not sufficient in SMF #2

Cause #2: Failure in N4 session, that is, when session change/generation with an UPF is impossible Cause #3: Authorized, that is, when a request of SMF #1 is not acceptable Cause #4: Semantic error, that is, when an error is generated while a context is being processed When the processing fails, the entire procedure is terminated.

In operation 507, the SMF #1 430 may determine whether it is possible to process a context transmission request, and, when it is determined that it is possible to process a context transmission request, the SMF #1 430 may perform a process for releasing an N4 session. Although not shown in FIG. 5, this process may be replaced by a process for changing the N4 Session with the UPF 450 from the SMF #1 430 to the SMF #2 440.

In operation 508, the SMF #1 430 may respond to the context transmission request by inserting the context requested by the SMF #2 440 in operation 506 into a container. When the request fails, the SMF #1 430 may add a failure cause to a response and transmit the response. Each failure cause may be replaced by a pre-arranged number.

Cause #2: Failure in N4 session, that is, when the SMF #2 440 fails in session change/generation with an UPF Cause #3: Authorized, that is, when a request of SMF #2 is not acceptable Cause #4: Semantic error, that is, when an error is generated while the received context is being processed When the processing fails, the entire procedure is terminated.

When the process for releasing the N4 session has been applied in operation 507 and operation 508 has succeeded, the SMF #2 440 may perform a process for establishing the N4 session (between SMF and UPF), together with the UPF 450, in operation 509. At this time, the SMF #2 440 may know what UPF the N4 session needs to be established with, by using PGW-U Tunnel Information included in the context, and when a UPF needs to be changed during N4 setting, the SMF #2 440 may perform a UPF selection process.

In operation S510, the SMF #2 440 may transmit a response indicating that the SMF has been changed, according to a request of the AMF 420.

In operation 511, the SMF #2 440 may perform remaining procedures which are to be processed due to a change in the SMF. The remaining procedures may include, for example, a process of performing registration in an UDM and a process of setting a PCC session with a PCF. Embodiments of the disclosure are not limited thereto.

When an NF Set includes several NFs (or NF instances) and the status of each NF dynamically changes, it may be more effective for an Old NF (SMF #1 430) to select a target NF according to circumstances at the moment when the context actually moves, than to designate the target NF.

Figure 6:
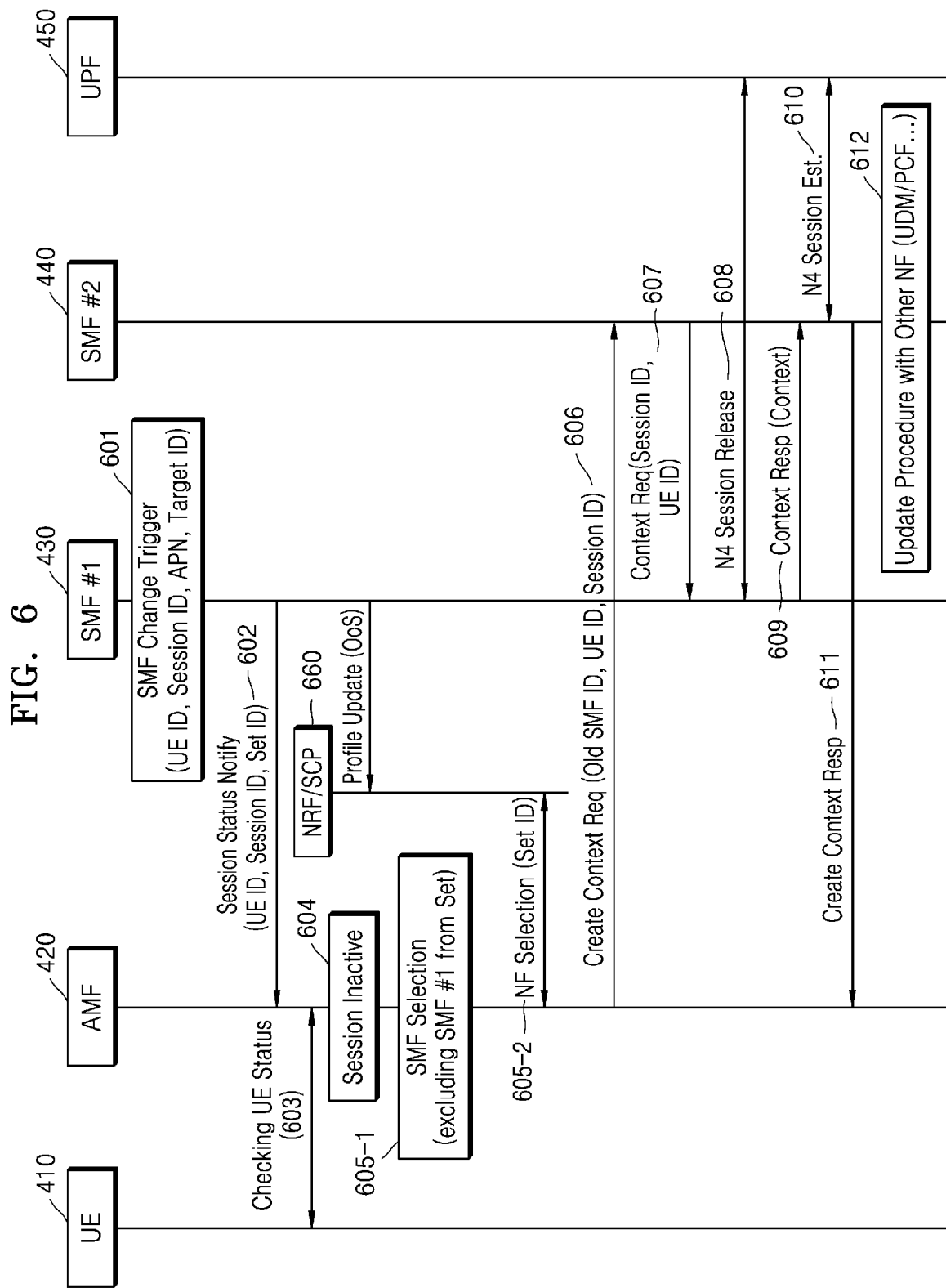
FIG. 6 illustrates a flowchart of a method of selecting an NF in consideration of a network situation, according to an embodiment of the disclosure.

FIG. 6 is a flowchart of a method of selecting an NF in consideration of a network situation, according to an embodiment of the disclosure.

According to another embodiment of the disclosure, when an NF needs to be changed, a method of selecting an NF in consideration of a network situation at the moment when context transmission is actually possible, rather than selecting and designating a target NF upon a request, is proposed.

In operation 601, the SMF #1 430 represents an old SMF that has provided a service for a UE 410. In operation 601, a condition for forwarding the service for the UE 410 to another SMF may be satisfied in the SMF #1 430. An operation of changing an SMF may begin according to an instruction of an operator or may begin at a request of an OAM system. In this case, the instruction or request for changing the SMF may include designation of a specific UE (or subscriber), a specific session, and a specific DNN/APN/Slice, or a target (target SMF) to be changed may be dynamically selected from an SMF set identical with a current SMF without being specified.

In operation 602, the SMF #1 430 may wait for a state where traffic transmission or transaction for a UE does not occur such that the above-described error such as a collision or a race condition is not generated when a service for the UE 410 (or subscriber) is transferred to another SMF. When the PDU session of the UE 410 is in an idle or inactive status, the SMF #1 430 may transmit a notification of notifying a change in the status of the PDU session for a UE, in order to request the AMF 420 for an operation for changing an SMF. Before performing operation 602, a subscription procedure for receiving a notification when a status for a specific PDU session has been changed from the AMF 420 to the SMF #1 430 may be conducted.

When the change in the status of the PDU session is notified and the SMF #1 430 is able to identify a target context as a separate ID, the SMF #1 430 may include a context ID, a context type, and the ID of a set including an SMF that is to be changed in a notification of notifying a change in the status of the PDU session and may transmit the notification. If the context ID is unable to be specified, the SMF #1 430 may include the ID of a target UE (subscriber), the ID of the PDU session, a Context Type, and the ID of the set including the SMF that is to be changed, in the notification, and may transmit the notification.

In operation 603, the AMF 420 may monitor a change in the status of the UE 410.

When the status of the PDU session of the UE 410 requested from the SMF #1 430 in operation 602 is satisfied (e.g., the idle or inactive status) in operation 604, the AMF 420 may perform operation 605-1 or 605-2.

In operation 605-1, the AMF 420 performs an operation for changing an SMF, because the status of the PDU session of the UE 410 has entered the SMF #1 430. The AMF 420 may select the SMF #2 440, which is a target SMF, by using the ID of the set received in operation 602. When the set includes information used to select an SMF (the capacity of each SMF, a current load state, and an operator preference), the AMF 420 may select the target SMF by using the information used to select an SMF.

Otherwise, in operation 605-2, the AMF 420 may perform a discovery and selection process for selecting an SMF, together with an NRF or SCP 660. At this time, the AMF 420 may use a Set ID of an SMF which is received in operation 602, and may transmit a message including information indicating a selection procedure for changing the SMF. When a single SMF has been previously set for an SMF changing operation, the single SMF may be explicitly selected. A subsequently selected SMF is referred to as the SMF #2 440.

In operation 606, the AMF 420 may transmit, to the SMF #2 440, a request for receiving a context for the PDU session and providing a service, by using the ID of the SMF selected in operation 602. A message of the request from the AMF 420 to the SMF #2 440 may include the ID of an SMF (SMF #1 430) that has provided a service to the UE 410, the ID and type of a target context or the ID of the UE 410 as a target, the ID of the PDU session, and the type of context.

In operation 607, the SMF #2 440 may transmit a context request for receiving a context from the SMF #1 430 and providing a service.

According to an embodiment of the disclosure, the SMF #2 440 may request context transmission by using a Nsmf_PDUSession_ContextRequest service by operating as a consumer. For example, when the SMF #2 440 has received a Context ID, the SMF #2 440 may request the SMF #1 430 to transmit a context by using the Context ID and the Context Type. Otherwise, the SMF #2 440 may request the SMF #1 430 to transmit a context by using the ID of a target UE (subscriber), the ID of the PDU session, and the Context Type.

When the SMF #2 440 is unable to subsequently received and provide a service, the SMF #2 440 may refuse the request. When the SMF #2 440 refuses the request, the SMF #2 440 may include a failure cause in a refusal message and transmit the refusal message. Each failure cause may be replaced with a pre-arranged number.

Cause #1: Not sufficient resources, that is, when resources are not sufficient in SMF #2

Cause #2: Failure in N4 session, that is, when session change/generation with an UPF is impossible Cause #3: Authorized, that is, when a request of SMF #1 is not acceptable Cause #4: Semantic error, that is, when an error is generated while a context is being processed When the processing fails, the entire procedure is terminated.

In operation 608, the SMF #1 430 may determine whether it is possible to process a context transmission request, and, when it is determined that it is possible to process a context transmission request, the SMF #1 430 may perform a process for releasing an N4 session. Although not shown in FIG. 5, this process may be replaced by a process for changing the N4 Session with the UPF 450 from the SMF #1 430 to the SMF #2 440.

In operation 609, the SMF #1 430 may respond to context transmission request by inserting the context requested by the SMF #2 440 in operation 606 into a container. When the request fails, the SMF #1 430 may add a failure cause to a response and transmit the response. Each failure cause may be replaced by a pre-arranged number.

Cause #2: Failure in N4 session, that is, when the SMF #2 440 fails in session change/generation with an UPF Cause #3: Authorized, that is, when a request of SMF #2 is not acceptable Cause #4: Semantic error, that is, when an error is generated while the received context is being processed When the processing fails, the entire procedure is terminated.

When the process for releasing the N4 session has been applied in operation 608 and operation 609 has succeeded, the SMF #2 440 may perform a process for establishing the N4 session (between SMF and UPF), together with the UPF 450, in operation 610. At this time, the SMF #2 440 may know what UPF the N4 session needs to be established with, by using PGW-U Tunnel Information included in the context, and when a UPF needs to be changed during N4 setting, the SMF #2 440 may perform a UPF selection process.

In operation S611, the SMF #2 440 may transmit a response indicating that the SMF has been changed, according to a request of the AMF 420.

In operation 612, the SMF #2 440 may perform remaining procedures which are to be processed due to a change in the SMF. The remaining procedures may include, for example, a process of performing registration in an UDM and a process of setting a PCC session with a PCF. Embodiments of the disclosure are not limited thereto.

In the above-described embodiment, a case where the AMF 420 directly requests the SMF #2 440, which is to be a target, to generate a context has been described on the basis of FIG. 5. However, execution of NF selection at the moment when the status of a UE (subscriber) has been changed is also applicable to the embodiment of FIG. 4. In this case, an SMF (SMF #1) may select a target SMF (SMF #2). When the SMF (SMF #1) may select the target SMF (SMF #2), above-described operation 607 may be changed as follows, and the other operations may be the same as those described above.

In operation 607, the SMF #1 430 may know that the status of the UE 410 is appropriate to perform an operation for transferring an SMF, and may perform an operation for selecting a target SMF. When the set includes information used to select an SMF (the capacity of each SMF, a current load state, and an operator preference), the AMF 430 may select the target SMF by using the information used to select an SMF.

Otherwise, the SMF #1 430 may perform a discovery and selection process for selecting an SMF, together with the NRF or SCP 660. At this time, the SMF #1 430 may use a Set ID of an SMF which is received in operation 602, and may transmit a message including information indicating a selection procedure for changing the SMF. When a single SMF has been previously set for an SMF changing operation, the single SMF may be explicitly selected. A subsequently selected SMF is referred to as the SMF #2 440.

According to the above-described embodiments regarding an operation of changing an NF, context exchange between NFs is performed after the session of a UE enters the idle or inactive status, in order to prevent occurrence of, for example, a collision or a race condition with respect to a transaction/procedure. However, when the above-described embodiments are applied to many UEs (subscribers) and a connected state is kept long according to a traffic transmission pattern, it may take long to transfer a UE (subscriber) to which an NF provides a service to another NF. Accordingly, FIG. 7 below describes a method of changing an NF by reducing a duration when a UE is changed to the idle or inactive status.

Figure 7:
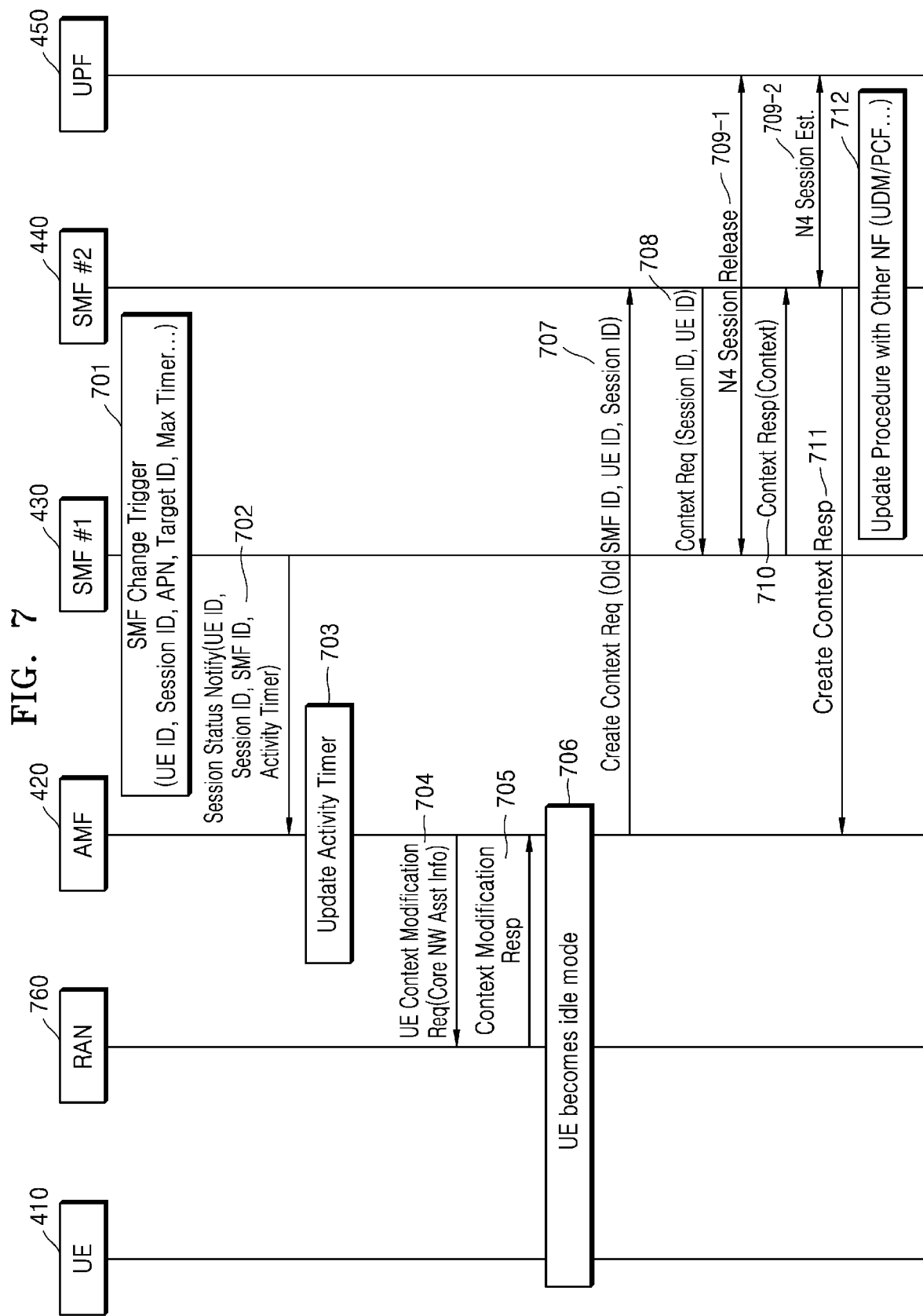
FIG. 7 illustrates a flowchart of a method of moving a context of an NF by reducing a time period when the status of a UE is changed, according to an embodiment of the disclosure.

FIG. 7 is a flowchart of a method of more quickly moving the context of an NF by reducing a time period during which the status of a UE (subscriber) is changed to the idle or inactive status, in consideration of a service type or operator settings, according to an embodiment of the disclosure.

In operation 701, the SMF #1 430 represents an old SMF that has provided a service for the UE 410. In operation 701, a condition for forwarding the service for the UE 410 to another SMF may be satisfied in the SMF #1 430. An operation of changing an SMF may begin according to an instruction of an operator or may begin at a request of an OAM system. The instruction or request for changing the SMF may include designation of a specific UE (or subscriber), a specific session, and a specific DNN/APN/Slice. According to a service type or operator settings, a standby time period until the session of a UE (subscriber) is changed to the idle or inactive status may be explicitly designated.

In operation 702, the SMF #1 430 may wait for a state where traffic transmission or transaction for a UE does not occur such that the above-described error such as a collision or a race condition is not generated when a service for the UE 410 (or subscriber) is transferred to another SMF. When the PDU session of the UE 410 is in the idle or inactive status, the SMF #1 430 may transmit a notification of notifying a change in the status of the PDU session for a UE, in order to request the AMF 420 for an operation for changing an SMF. Before performing operation 702, a subscription procedure for receiving a notification when a status for a specific PDU session has been changed from the AMF 420 to the SMF #1 430 may be conducted.

When the change in the status of the PDU session is notified and the SMF #1 430 is able to identify a target context as a separate ID, the SMF #1 430 may include a context ID, a context type, and the SMF ID that is to be changed or the SMF Set ID including the SMF in a notification of notifying a change in the status of the PDU session and may transmit the notification. If the context ID is unable to be specified, the SMF #1 430 may include the ID of a target UE (subscriber), the ID of the PDU session, a Context Type, and the SMF ID that is to be changed or the SMF Set ID including the SMF, in the notification, and may transmit the notification. The notification of notifying a change in the status of the PDU session may include an expected activity period until the session of a UE (subscriber) is changed to the idle or inactive status.

In other words, the expected activity period may be a parameter that a UE transits to the idle or inactive status when traffic (user data) with the UE or signaling is not transmitted or received during a certain time period. The SMF #1 430 may more quickly transit the UE (subscriber) to the idle or inactive status by setting an expected activity period (e.g., 1 second) for a UE (subscriber) to which an SMF change is to be applied to be shorter than a time period during which a UE transits to the idle status in a general case.

In operation 703, the AMF 420 may update the expected activity period for the UE by using the received information. In operation 704, the AMF 420 may transmit the expected activity period for the UE to a base station (RAN) 760 via an NG-AP message. In detail, the AMF 420 may insert an expected activity period into an Expected UE Activity Behavior among core network assistance information within a UE Context Modification Request message and may transmit the core network assistance information to the RAN 760.

In operation 705, the RAN 760 may store the received core network assistance information, transmit a response to the received core network assistance information to the AMF 420, and control a connection state for the UE 410 by using the expected activity period.

When the status of the PDU session of the UE 410 requested from the SMF #1 430 in operation 702 is satisfied (e.g., the idle or inactive status) in operation 706, the AMF 420 may perform operation 707.

In operation 707, the AMF 420 may perform an operation for changing the SMF, because the statue of the PDU session of the UE 410 has been suitably changed to perform an operation for transferring the SMF to the SMF #1 43. The AMF 420 may select a target SMF by using the ID of the set received in operation 702. When the set includes information used to select an SMF (the capacity of each SMF, a current load state, and an operator preference), the AMF 420 may select the target SMF by using the information used to select an SMF. Otherwise, the AMF 420 may perform a discovery and selection process for selecting an SMF, together with an NRF or SCP. At this time, the AMF 420 may use the Set ID of an SMF which is received in operation 702, and may transmit a message including information indicating a selection procedure for changing the SMF. When a single SMF has been previously set for an SMF changing operation, the single SMF may be explicitly selected. A subsequently selected SMF is referred to as the SMF #2 440.

The AMF 420 may transmit, to the SMF #2 440, a request for receiving a context for the PDU session and providing a service, by using the ID of the SMF selected in operation 702. A message of the request from the AMF 420 to the SMF #2 440 may include the ID of an SMF (SMF #1 430) that has provided a service to the UE 410, the ID and type of a target context or the ID of a target UE, the ID of the PDU session, and the type of context.

In operation 708, the SMF #2 440 may transmit a context request for receiving the context from the SMF #1 430 and providing a service.

According to an embodiment of the disclosure, the SMF #2 440 may request context transmission by using a Nsmf_PDUSession_ContextRequest service, by operating as a consumer. For example, when the SMF #2 440 has received a Context ID, the SMF #2 440 may request the SMF #1 430 to transmit a context by using the Context ID and the Context Type. Otherwise, the SMF #2 440 may request the SMF #1 430 to transmit a context by using the ID of a target UE (subscriber), the ID of the PDU session, and the Context Type.

When the SMF #2 440 is unable to subsequently received and provide a service, the SMF #2 440 may refuse the request. When the SMF #2 440 refuses the request, the SMF #2 440 may include a failure cause in a refusal message. Each failure cause may be replaced with a pre-arranged number.

Cause #1: Not sufficient resources, that is, when resources are not sufficient in SMF #2

Cause #2: Failure in N4 session, that is, when session change/generation with an UPF is impossible Cause #3: Authorized, that is, when a request of SMF #1 is not acceptable Cause #4: Semantic error, that is, when an error is generated while a context is being processed When the processing fails, the entire procedure is terminated.

In operation 709-1, the SMF #1 430 may determine whether it is possible to process a context transmission request, and, when it is determined that it is possible to process a context transmission request, the SMF #1 430 may perform a process for releasing an N4 session. Although not shown in FIG. 5, this process may be replaced by a process for changing the N4 Session with the UPF 450 from the SMF #1 430 to the SMF #2 440.

In operation 710, the SMF #1 430 may respond to the context transmission request by inserting the context requested by the SMF #2 440 in operation 706 into a container. When the request fails, the SMF #1 430 may add a failure cause to a response and transmit the response. Each failure cause may be replaced by a pre-arranged number.

Cause #2: Failure in N4 session, that is, when the SMF #2 440 fails in session change/generation with an UPF Cause #3: Authorized, that is, when a request of SMF #2 is not acceptable Cause #4: Semantic error, that is, when an error is generated while the received context is being processed When the processing fails, the entire procedure is terminated.

When the process for releasing the N4 session has been applied in operation 709-1 and operation 708 has succeeded, the SMF #2 440 may perform a process for establishing the N4 session (between SMF and UPF), together with the UPF 450, in operation 709-2. At this time, the SMF #2 440 may know what UPF the N4 session needs to be established with, by using PGW-U Tunnel Information included in the context, and when a UPF needs to be changed during N4 setting, the SMF #2 440 may perform a UPF selection process.

In operation S711, the SMF #2 440 may transmit a response indicating that the SMF has been changed, according to a request of the AMF 420.

In operation 712, the SMF #2 440 may perform remaining procedures which are to be processed due to a change in the SMF. The remaining procedures may include, for example, a process of performing registration in a Unified Data Management (UDM) and a process of setting a Policy and Charging Control (PCC) session with a PCF. Embodiments of the disclosure are not limited thereto.

The embodiment of FIG. 7 may be modified to an embodiment in which, when a UE does not enter the idle or inactive status during a preset time period, a change in the status of the UE is explicitly triggered to perform an SMF change. The method of changing an NF by using a method of explicitly triggering a change in the status of a UE will now be described in greater detail with reference to FIG. 8.

Figure 8:
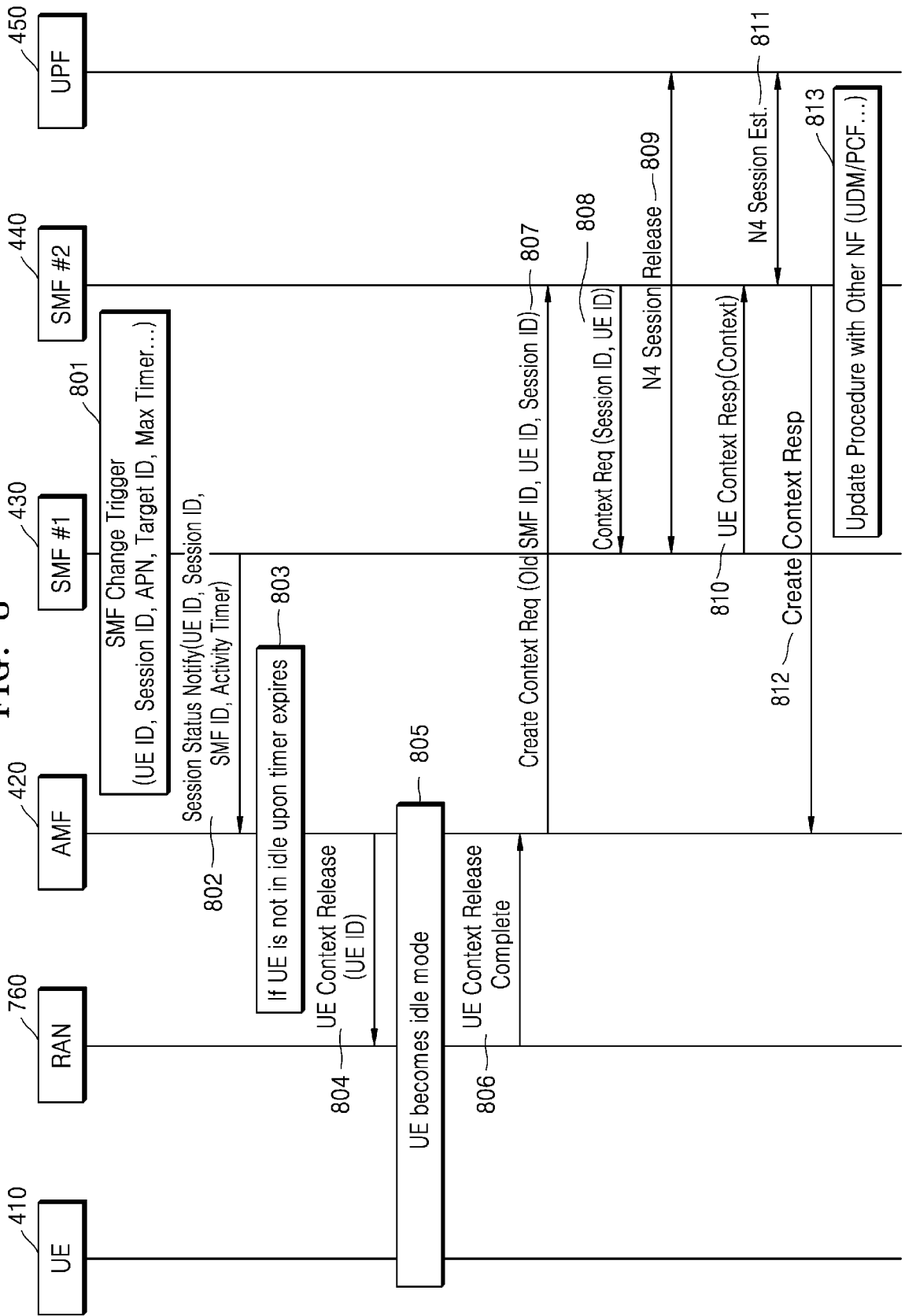
FIG. 8 illustrates a flowchart of a method of performing a change in an NF by triggering a change in the status of a UE, according to an embodiment of the disclosure.

FIG. 8 is a flowchart of a method of changing an NF by triggering a change in the status of a UE, according to an embodiment of the disclosure.

In operation 801, the SMF #1 430 represents an old SMF that has provided a service for the UE 410. In operation 801, a condition for forwarding the service for the UE 410 to another SMF may be satisfied in the SMF #1 430. An operation of changing an SMF may begin according to an instruction of an operator or may begin at a request of an OAM system. The instruction or request for changing the SMF may include designation of a specific UE (or subscriber), a specific session, and a specific DNN/APN/Slice. According to a service type or operator settings, a standby time period until the session of a UE (subscriber) is changed to the idle or inactive status may be explicitly designated.

In operation 802, the SMF #1 430 may wait for a state where traffic transmission or transaction for a UE does not occur such that the above-described error such as a collision or a race condition is not generated when a service for the UE 410 (or subscriber) is transferred to another SMF. When the PDU session of the UE 410 is in the idle or inactive status, the SMF #1 430 may transmit a notification of notifying a change in the status of the PDU session for a UE, in order to request the AMF 420 for an operation for changing an SMF. Before performing operation 802, a subscription procedure for receiving a notification when a status for a specific PDU session has been changed from the AMF 420 to the SMF #1 430 may be conducted.

When the change in the status of the PDU session is notified and the SMF #1 430 is able to identify a target context as a separate ID, the SMF #1 430 may include a context ID, a context type, and the SMF ID that is to be changed or the SMF Set ID including the SMF in a notification of notifying a change in the status of the PDU session and may transmit the notification. If the context ID is unable to be specified, the SMF #1 430 may include the ID of a target UE (subscriber), the ID of the PDU session, a Context Type, and the ID of the SMF that is to be changed or the ID of the set including the SMF, in the notification, and may transmit the notification. The notification of notifying a change in the status of the PDU session may include a maximum waiting time until the session of a UE (subscriber) is changed to the idle or inactive status.

In operation 803, the AMF 420 executes a timer according to received information, and, when the UE does not enter the idle or inactive status within a certain time period, the AMF 420 transmits a UE Context Release request to the RAN 760 in order to change the status of the UE to the idle status.

In operations 804 through 806, the RAN 760 may perform an operation for changing the UE to the idle status, according to the request from the AMF 420.

Operations 807 through 813 correspond to those described above, and thus detailed descriptions thereof will be omitted.

According to an embodiment of the disclosure, when an inactive (more specifically, RRC (Radio Resource Control) Inactive) status is applied to the UE 410, a traffic is transmitted between the UE 410 and the RAN 760, but a core network (AMF 420 or SMF (430 or 440)) may not be aware of this state. In this situation, when an SMF change is triggered, a service quality may be affected. Accordingly, the RRC Inactive status may be set to be not applied to the UE (subscriber) that needs an SMF change.

In other words, when the RRC Inactive status is able to be applied to the UE 410 and thus RRC Inactive Assistance Information has already been transmitted to a base station (e.g., RAN or NG-RAN) 760, the AMF 420 may delete the RRC Inactive Assistance Information via a UE Context Modification procedure. When the RRC Inactive Assistance Information has not yet been transmitted for the UE 410 to the NG-RAN 760, the AMF 420 needs to not include the RRC Inactive Assistance Information in a UE Context transmitted for the UE 410 to the RAN 760 later.

According to an embodiment of the disclosure, as described above, NFs including an SMF are able to transmit or receive Context to or from each other and provide a service. This structure may be used to subsequently provide a service of UEs that have received services in the related art, when a failure occurs in a specific NF or a specific NF is removed for a reason such as a capacity reduction, and when an operation such as changing or updating of settings of a specific NF occurs. Like the above-described embodiment, an NF that subsequently receives a service provided by a specific NF may be selected considering designation by an OAM or the status of a dynamic network. However, according to a network redundancy scheme, the specific NF may be previously designated for backup. According to this scheme, the time necessary for, for example, newly generating an NF that is to subsequently receive a service or searching for the NF in an emergency situation such as failure occurrence may be reduced.

According to an embodiment of the disclosure, an NF for use in backup may be configured using a free method such as designing one or more NF as a backup NF within a specific NF set or designating a backup NF for each NF.

Figure 9:
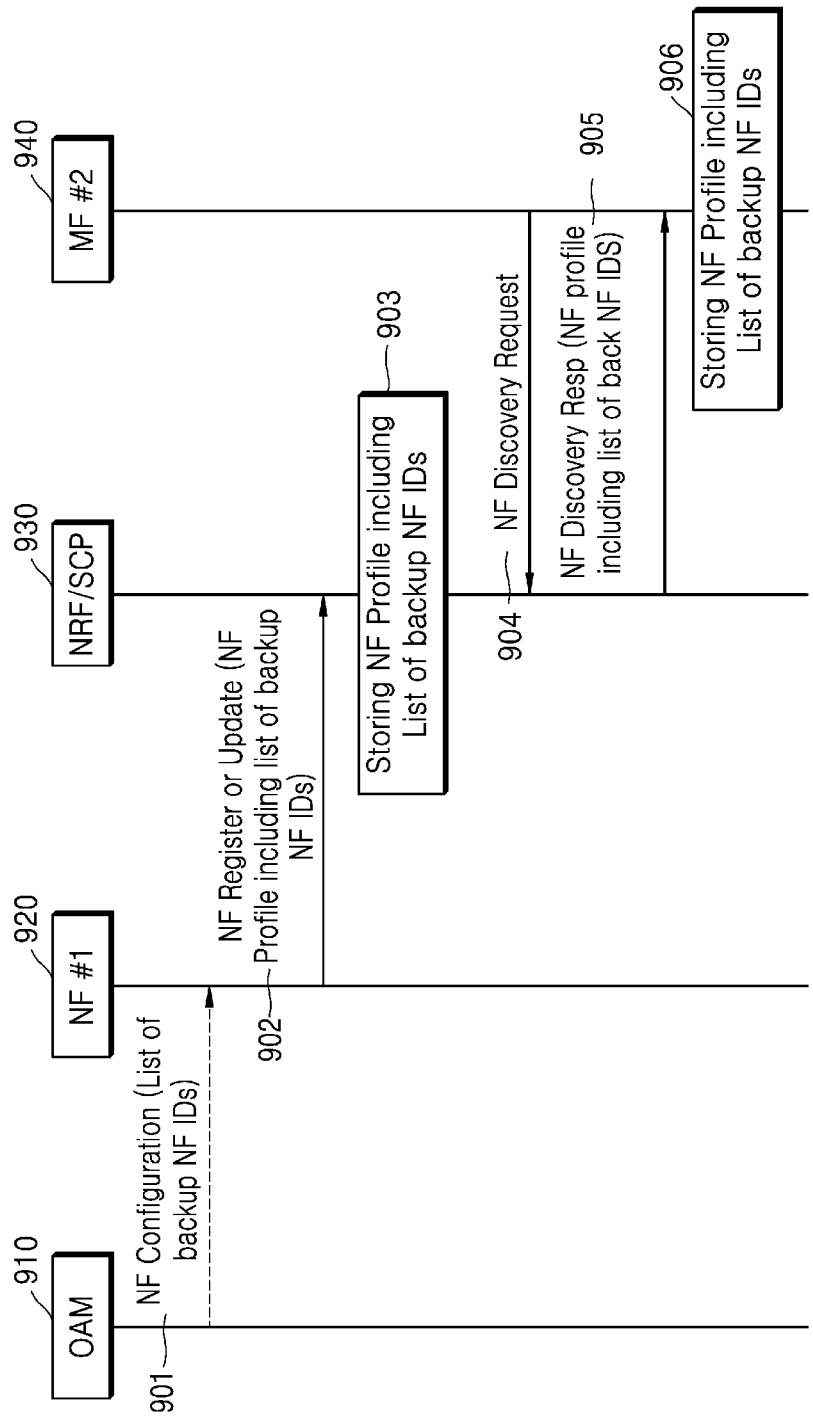
FIG. 9 illustrates a flowchart of a method of exchanging information about NFs which are to serve as backup NFs, according to an embodiment of the disclosure.

FIG. 9 is a flowchart of a method of exchanging information about NFs which are to serve as backup NFs, according to an embodiment of the disclosure.

In operation 901, an NF #1 920 receives or sets information about NFs that are to operate as backup NFs. A list of the NFs that are to operate as backup NFs may include the IDs of the NFs that are to be used as backup NFs, and may be divided by use purposes, namely, into backup for failure, backup for planned removal, and backup for operation items.

In operation 902, the NF #2 940 may register or update its own information in an NRF/SCP 930. At this time, the NF #2 940 may transmit its own NF profile. The NF profile may include a list of NFs that are to operate as NF Profile Backup NFs, and the list may include the IDs of the NFs that are to be used as backup NFs. The list may be divided by use purposes, namely, into backup for failure, backup for planned removal, and backup for operation items.

In operation 903, the NRF/SCP 930 stores the received NF Profile. The NF Profile may include a list of NFs that are to operate as backup NFs. The list may include the IDs of the NFs that are to be used as backup NFs, and may be divided by use purposes, namely, into backup for failure, backup for planned removal, and backup for operation items.

In operation 904, another NF (referred to as an NF #2 940) may use a service provided by the NF #1 920 or may transmit an NF Discovery request for receiving information of the NF #1 920 to the NRF/SCP 930.

In operation 905, the NRF/SCP 930 may transmit the NF Profile while responding to the NF Discovery in operation 904. The NF Profile may include a list of the NFs that are to operate as backup NFs, and the list may include the IDs of the NFs that are to be used as backup NFs, and may be divided by use purposes, namely, into backup for failure, backup for planned removal, and backup for operation items.

In operation 906, the NF #2 940 may store the received NF profile. When there is a service provided in connection with the NF #1 920 and an NF (referred to as an NF #3) to replace the NF #1 920 needs to be selected due to a failure or the like, the NF #2 940 may provide a service by using an NF included in a Backup List of the NF #1 920.

The NF #2 940 may know that a change to another NF is necessary, by being directly notified that the NF #1 920 no longer provides a service (Notification with respect to an NF Status change), or may know that the NF #1 920 no longer provides a service and a change to another NF is necessary, by being notified of a status with respect to the NF #1 920 by the NRF/SCP 930 when the NF #1 920 informs the NRF/SCP 930 of a status change.

When the NF #2 940 requests the NF #1 920 for a specific service or there is no processing such as a response to a sent message, the NF #2 940 may also know that the NF #1 920 no longer provides a service and a change to another NF is necessary.

In the above-described embodiment, the NF #1 920 transmits its own Backup NF information via the NRF/SCP 930 by notifying other NFs of the Backup NF information. However, the NF #1 920 may directly transmit its own Backup NF information during message exchange between NFs. In other words, when the NF #1 920 interoperates with another NF to provide a specific service (when Registration or Association is established or an NF status is transmitted), the NF #1 920 may transmit its own Backup NF information (same information as the information described above with reference to the embodiment of FIG. 9) directly to the other NF. The use of the Backup NF information by the NF that has received the same is the same as the above-described embodiment.

Figure 10:
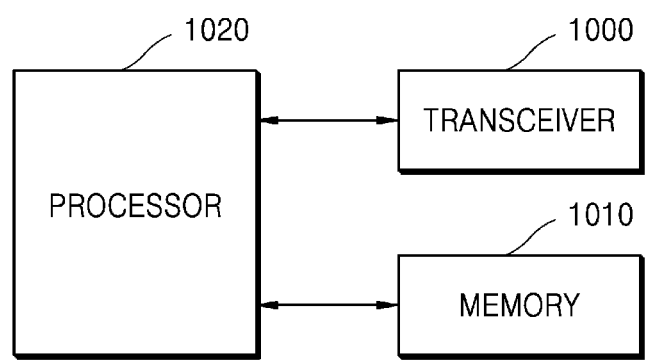
FIG. 10 illustrates a block diagram of a network entity according to an embodiment of the disclosure.

FIG. 10 is a block diagram of a structure of a network entity according to an embodiment of the disclosure. The network entity is a concept including a network function according to a system implementation.

Referring to FIG. 10, the network entity may include a transceiver 1000, a memory 1010, and a processor 1020. The processor 1020, the transceiver 1000, and the memory 1010 of the network entity may operate according to the above-described communication method of the network entity. However, components of the network entity are not limited thereto. For example, the network entity may include more or fewer components than those shown in FIG. 10. Furthermore, the processor 1020, the transceiver 1000, and the memory 1010 may be implemented as a single chip. The processor 1020 may include one or more processors.

The transceiver 1010, which collectively refers to a receiver of the network entity and a transmitter of the network entity, may transmit or receive signals with a base station. The signal transmitted or received to or from the base station may include control information and data. To this end, the transceiver 1000 may include a radio frequency (RF) transmitter that up-converts and amplifies the frequency of a signal to be transmitted, and an RF receiver that low-noise-amplifies a received signal and down-converts the frequency of the received signal. However, this is only an embodiment of the transceiver 1000, and the components of the transceiver 1000 are not limited thereto. The transceiver 1000 may transmit or receive a signal to or from other network entities.

The transceiver 1000 may receive a signal and output the signal to the processor 1020 through a wireless channel, and may transmit the signal output by the processor 1020 through a wireless channel.

The memory 1010 may store data and programs necessary for operations of the network entity. Furthermore, the memory 1010 may store control information or data included in a signal obtained by the network entity. The memory 1010 may include storage media, such as read-only memory (ROM), random access memory (RAM), a hard disk, compact disc (CD)-ROM, and a digital versatile disc (DVD), or a combination thereof.

The processor 1020 may control a series of processes so that the network entity may operate according to the embodiments of the disclosure. For example, the processor 1020 may receive control signals and data signals through the transceiver 1000 and process the received control signals and the received data signals. Furthermore, the processor 1020 may transmit the processed control signal and the processed data signal to the transceiver 1000.

The transceiver 1000, the memory 1010, and the processor 1020 may be electrically connected to one another. For example, the controller 910 may be a circuit, an application-specific circuit, or at least one processor. Further, operations of the network entity may be realized by including a memory device storing a corresponding program code in any component in the network entity.

The network entity may be a base station (RAN), an AMF, an SMF, a UPF, an NF, an NEF, an NRF, a CF, an NSSF, a UDM, an AF, an AUSF, a SCP, an UDSF, context storage, OAM, EMS, a configuration server, or an ID management server. Embodiments of the disclosure are not limited thereto.

Figure 11:
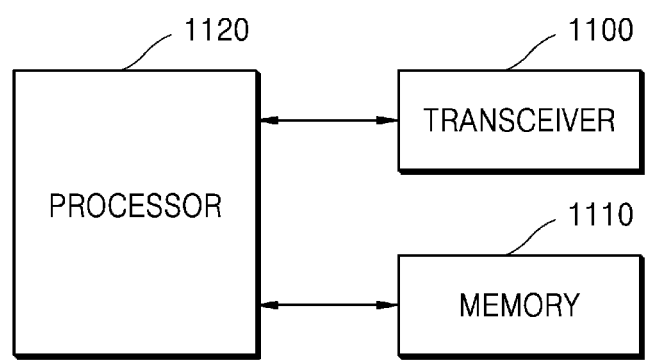
FIG. 11 illustrates a block diagram of a UE according to an embodiment of the disclosure.

FIG. 11 is a block diagram of a structure of a user equipment (UE) according to an embodiment of the disclosure.

Referring to FIG. 11, the UE may include a transceiver 1100, a memory 1110, and a processor 1120. The processor 1120, the transceiver 1100, and the memory 1110 of the UE may operate according to the above-described communication method of the UE. However, components of the UE are not limited thereto. For example, the UE may include more or fewer components than those shown in FIG. 11. Furthermore, the processor 1120, the transceiver 1100, and the memory 1110 may be implemented as a single chip. The processor 1120 may include one or more processors.

The transceiver 1100, which collectively refers to a receiver of the UE and a transmitter of the UE, may transmit or receive signals with a base station. The signal transmitted or received to or from the base station may include control information and data. To this end, the transceiver 1100 may include an RF transmitter that up-converts and amplifies the frequency of a signal to be transmitted, and an RF receiver that low-noise-amplifies a received signal and down-converts the frequency of the received signal. However, this is only an embodiment of the transceiver 1100, and the components of the transceiver 1100 are not limited thereto.

The transceiver 1100 may receive a signal and output the signal to the processor 1120 through a wireless channel, and may transmit the signal output by the processor 1120 through a wireless channel.

The memory 1110 may store data and programs necessary for operations of the UE. Furthermore, the memory 1110 may store control information or data included in a signal obtained by the UE. The memory 1110 may include storage media, such as read-only memory (ROM), random access memory (RAM), a hard disk, compact disc (CD)-ROM, and a digital versatile disc (DVD), or a combination thereof.

The processor 1120 may control a series of processes so that the UE may operate according to the embodiments of the disclosure. For example, the processor 1120 may receive control signals and data signals through the transceiver 1100 and process the received control signals and the received data signals. Furthermore, the processor 1120 may transmit the processed control signal and the processed data signal to the transceiver 1100.

The diagrams, the flowcharts of the control/data signal transmitting methods, and the illustration of the operating procedure illustrated in FIGS. 1 through 11 are not intended to restrict the scope of the disclosure. In other words, all of the components, entities, or operations described above with reference to FIGS. 1 through 11 should not be interpreted as essential components for implementing the disclosure, and the disclosure may also be implemented by including only some of the components, without departing from the essence of the disclosure.

The methods according to embodiments of the disclosure as described in the specification or in the following claims may be implemented as hardware, software, or a combination of hardware and software.

When implemented as software, a computer-readable storage medium or computer program product storing one or more programs (e.g., software modules) may be provided. The one or more programs stored in the computer-readable storage medium or computer program product are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory (including RAM or flash memory), ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device performing the embodiments of the disclosure via an external port. Furthermore, a separate storage device on the communication network may access a device performing the embodiments of the disclosure.

In the above-described embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Provided is a method and apparatus capable of effectively supporting services in a wireless communication system.

The embodiments of the disclosure disclosed in the specification and drawings are merely presented specific examples to easily explain the technical contents of the disclosure and promote understanding of the disclosure, and are not intended to limit the scope of the disclosure. In other words, it is obvious to those skilled in the art that other modifications based on the technical spirit of the disclosure can be implemented. In addition, each of the above embodiments can be combined with each other if necessary to operate. For example, portions of one embodiment of the disclosure and another embodiment may be combined with each other. Moreover, other modifications based on the technical spirit of the above embodiment may be implemented in various systems such as LTE systems and 5G or NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a first session management function (SMF), for providing a continuous service to a user equipment (UE), the method comprising:
    identifying, by the first SMF, triggering of an SMF change operation;
    performing a subscription procedure with an access and mobility management function (AMF) for an event in which a status of the UE becomes an idle or an inactive;
    in case that the status of the UE becomes the idle or the inactive, receiving, from the AMF, a notification message to report the event;
    transmitting, to the AMF, a message indicating a change in a status of a protocol data unit (PDU) session so as to request a procedure of an SMF change, wherein the message indicating the change in the status of the PDU session includes a context identification (ID);

receiving a context request message requesting a context from a second SMF that is a target SMF; and transmitting a context request response message to the second SMF.

2. The method of claim 1, wherein the SMF change operation is triggered in response to a request by operations, administration and maintenance (OAM), and wherein the request by the OAM includes the at least one of a second SMF ID (identification) or an SMF set ID.

3. The method of claim 1, wherein the second SMF is selected by the AMF or a Service Communication Proxy (SCP) as an SMF corresponding to a second SMF ID when the message indicating the change in the status of the PDU session includes the second SMF ID; and wherein the second SMF is selected by the AMF or the SCP as an SMF among SMFs corresponding to an SMF set ID when the message indicating the change in the status of the PDU session includes the SMF set ID.

4. The method of claim 1, wherein the message indicating the change in the status of the PDU session further includes a PDU session ID; and wherein the context request message requesting the context of the UE includes at least one of context type information or the context ID.

5. The method of claim 1, further comprising:

transmitting, to a User Plane Function (UPF), request message for releasing a N4 session with the UPF; and receiving, form the UPF, a response message for releasing the N4 session in response to the request message for releasing the N4 session with the UPF.

6. The method of claim 1, further comprising:

transmitting, to the AMF, a message requesting notification of information about a change in a status of UE; and receiving, from the AMF, a notification message indicating the change in the status of the UE.

7. A method, performed by an access and mobility management function (AMF), for providing a continuous service to a user equipment (UE), the method comprising:

performing a subscription procedure with a first session management function (SMF) for an event in which a status of the UE becomes an idle or an inactive;

in case that the status of the UE becomes the idle or the inactive, transmitting, to the first SMF, a notification message to report the event;

receiving, from the first SMF, a message indicating a change in a status of a protocol data unit (PDU) session so as to request a procedure of an SMF change, wherein the message indicating the change in the status of the PDU session includes a context identification (ID);

identifying a second SMF that is a target SMF;

transmitting, to the second SMF, a request message of requesting generation of a new session; and receiving, from the second SMF, a response message with respect to the request message of requesting generation of the new session.

8. The method of claim 7, wherein the second SMF is selected by the AMF or a Service Communication Proxy (SCP) as an SMF corresponding to a second SMF ID when the message indicating the change in the status of the PDU session includes the second SMF ID; and wherein the second SMF is selected by the AMF or the SCP as an SMF among SMFs corresponding to an SMF set ID when the message indicating the change in the status of the PDU session includes the SMF set ID.

9. The method of claim 7, wherein the message indicating the change in the status of the PDU session further includes a PDU session ID; and wherein a context request message requesting a context of the UE includes at least one of context type information or the context ID.

10. The method of claim 7, further comprising:

receiving, from the first SMF, a message requesting notification of information about a change in a status of UE; and transmitting, to the first SMF, a notification message indicating the change in the status of the UE.

11. A first session management function (SMF) for providing a continuous service to a user equipment (UE), the SMF comprising:

a transceiver; and at least one processor coupled with the transceiver and configured to:

identify, by the first SMF, triggering of an SMF change operation, perform a subscription procedure with an access and mobility management function (AMF) for an event in which a status of the UE becomes an idle or an inactive, in case that the status of the UE becomes the idle or the inactive, receive, from the AMF, a notification message to report the event, transmit, to the AMF, a message indicating a change in a status of a protocol data unit (PDU) session so as to request a procedure of an SMF change, wherein the message indicating the change in the status of the PDU session includes a context identification (ID), to receive a context request message requesting a context of from a second SMF that is a target SMF, and transmit a context request response message to the second SMF.

12. The first SMF of claim 11, wherein the SMF change operation is triggered in response to a request by operations, administration and maintenance (OAM), and wherein the request by the OAM includes the at least one of a second SMF ID (identification) or an SMF set ID.

13. The first SMF of claim 11, wherein the second SMF is selected by the AMF or a Service Communication Proxy (SCP) as an SMF corresponding to a second SMF ID when the message indicating the change in the status of the PDU session includes the second SMF ID; and wherein the second SMF is selected by the AMF or the SCP as an SMF among SMFs corresponding to an SMF set ID when the message indicating the change in the status of the PDU session includes the SMF set ID.

14. The first SMF of claim 11, wherein the message indicating the change in the status of the PDU session further includes a PDU session ID; and wherein the context request message requesting the context of the UE includes at least one of context type information or the context ID.

15. The first SMF of claim 11, wherein the at least one processor is further configured to:

transmit, to a User Plane Function (UPF), request message for releasing a N4 session with the UPF, and receive, form the UPF, a response message for releasing the N4 session in response to the request message for releasing the N4 session with the UPF.

16. The first SMF of claim 11, wherein the at least one processor is further configured to:
  transmit, to the AMF, a message requesting notification of information about a change in a status of UE; and
  receive, from the AMF, a notification message indicating the change in the status of the UE.

17. An access and mobility management function (AMF) for providing a continuous service to a user equipment (UE), the AMF comprising:
  a transceiver; and
  at least one processor coupled with the transceiver and configured to:
    perform a subscription procedure with a first session management function (SMF for an event in which a status of the UE becomes an idle or an inactive,
    in case that the status of the UE becomes the idle or the inactive, transmit, to the first SMF, a notification message to report the event,
    receive, from the first SMF, a message indicating a change in a status of a protocol data unit (PDU) session so as to request a procedure of an SMF change, wherein the message indicating the change in the status of the PDU session includes a context identification (ID),
    identify a second SMF that is a target SMF,
    transmit, to the second SMF, a request message of requesting generation of a new session, and
    receive, from the second SMF, a response message with respect to the request message of requesting generation of the new session.

18. The AMF of claim 17,
  wherein the second SMF is selected by the AMF or a Service Communication Proxy (SCP) as an SMF corresponding to a second SMF ID when the message indicating the change in the status of the PDU session includes the second SMF ID; and
  wherein the second SMF is selected by the AMF or the SCP as an SMF among SMFs corresponding to an SMF set ID when the message indicating the change in the status of the PDU session includes the SMF set ID.

19. The AMF of claim 17,
  wherein the message indicating the change in the status of the PDU session further includes a PDU session ID; and
  wherein a context request message requesting a context of the UE includes at least one of context type information or the context ID.

20. The AMF of claim 17, wherein the at least one processor is further configured to:
  receive, from the first SMF, a message requesting notification of information about a change in a status of UE, and
  transmit, to the first SMF, a notification message indicating the change in the status of the UE.

* * * * *